June 23, 1953     T. D. PELLEGRINO     2,643,309
SIGNAL DEVICE FOR MOTOR VEHICLES
Filed Aug. 17, 1950
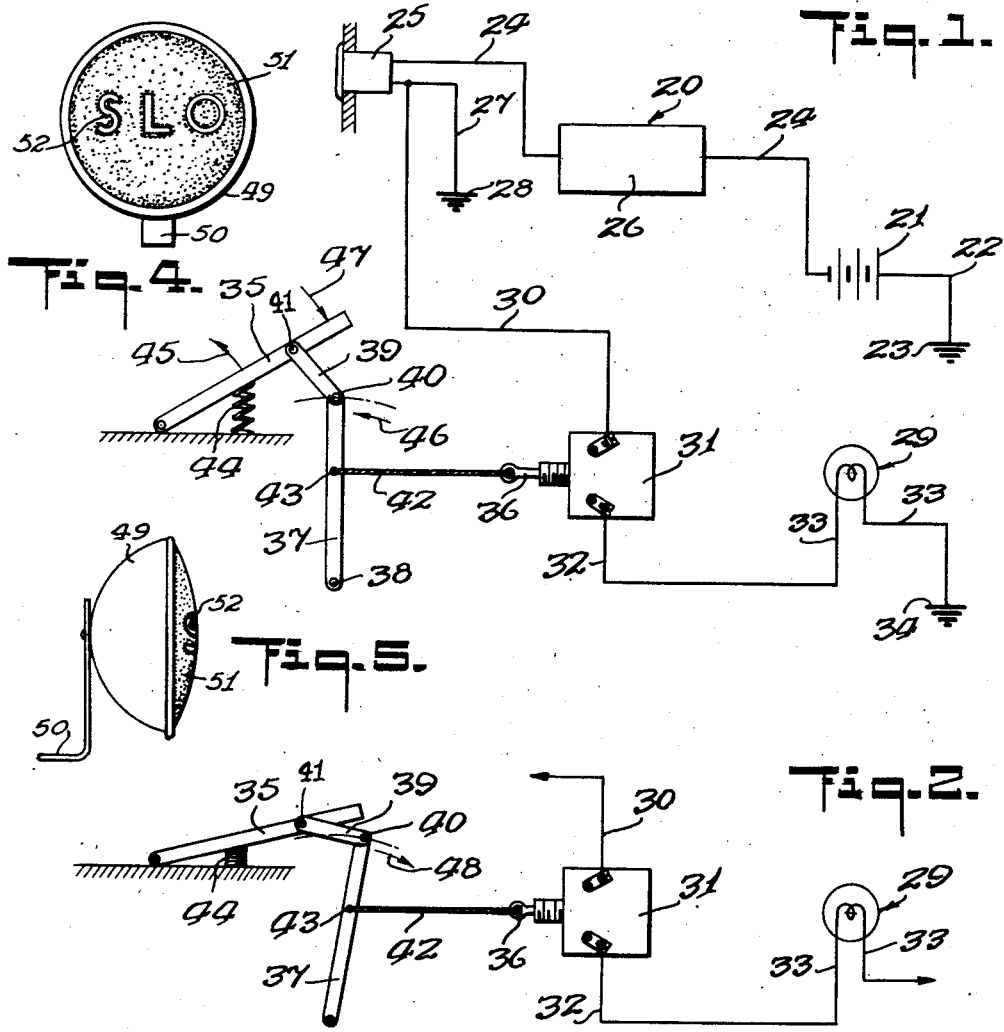
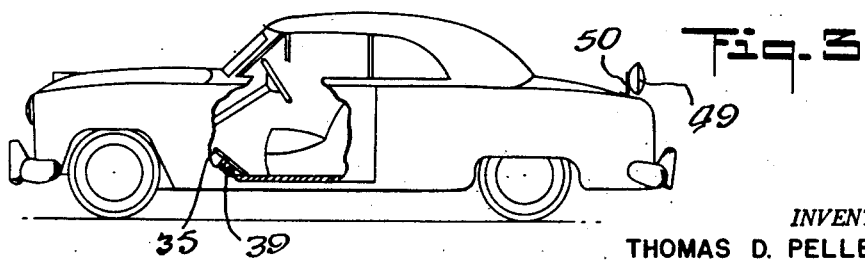
INVENTOR:
THOMAS D. PELLEGRINO.
BY: *Julian J. Wittal,*
his ATTORNEY.

Patented June 23, 1953

2,643,309

UNITED STATES PATENT OFFICE 2,643,309

SIGNAL DEVICE FOR MOTOR VEHICLES

Thomas D. Pellegrino, Garden City Park, N. Y.

Application August 17, 1950, Serial No. 179,950

1 Claim. (Cl. 200—59)

This invention relates to a signaling device for drivers of automobiles, and has for its main object to provide a signal device indicating at the rear of a car that the same will slow down or entirely stop or that when the car is stopped it is on the point of starting, such signal device being novel and improved with reference to signaling devices now in use or heretofore proposed.

Another object of this invention is to provide a device as characterized hereinbefore, wherein the device will be controlled by an element which again controls the operation of the car, so that my invention will be inoperative as long as the car is inoperative and becomes operative when the car is placed into such condition.

Still a further object of my invention is to provide a device of the type indicated which will be controlled by the ignition switch of the automobile.

Still another object of this invention is to provide a device for indicating slowing or stopping of the car which may be interconnected with the usual accelerator pedal, that is, when the car is in usual motion, my device will be made inoperative, but on releasing the accelerator pedal, that is, slowing or stopping the car will make my device automatically operative and show the driver to the rear of the car that the same is to slow down or stop. It will be obvious that there is a great need for such an effective signaling device which will work automatically without any special attention of the driver, whereby the driver to the rear of the car will have ample notice of the slowing down of the car in question and can take appropriate measures to avoid possible collision. In a similar manner the operation of my device may be dependent on the operation of the brake pedal, but, obviously, in the reverse sense, that is, when the brake pedal is operative then my device will be made operative automatically.

Still another object of my invention is to provide a device for indicating slowing or stopping of a car or the moment of its restarting, by a signal device which normally is inoperative when the car is in inoperative condition, as for instance, the operation of the same depending on the closing of the ignition circuit, and which device may be operated by the driver independently of any other member of the car mechanism when the driver so desires.

Still other objects of this invention will be apparent as the specification of the same proceeds or will be pointed out therein, and, among others, I may mention: to provide a device of the improvements and advantages indicated hereinbefore, which still will be simple in construction, inexpensive in operation, and easy to add to the construction of a motor vehicle whether at the manufacturing thereof or later.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:

Fig. 1 is a diagram of a preferred embodiment of my invention as applied to the electric ignition circuit of a motor vehicle and being made dependent on the use of the fuel charge control or accelerator pedal, in said diagram the same being shown in an operative position;

Fig. 2 is a fragmentary detail of said device showing the control switch in an inoperative position;

Fig. 3 is a diagrammatic elevational view of a motor vehicle indicating my invention applied thereto;

Figs. 4 and 5 are front and side views of a preferred form of a signal device to be used with my invention.

Referring now to the drawings more in detail, by characters of reference, and particularly to Fig. 1, the numeral 20 indicates the usual ignition circuit of a motor car, in general, and the elements shown therein are a source of current 21, a conductor 22 from one pole of the same to a grounding 23, a conductor 24 from the other pole thereof to the usual ignition switch 25. A number of desired electric devices generally indicated by the numeral 26, like spark plugs, lights, etc., may be inserted into the conductor 24. A conductor 27 is connected to the switch 25 grounding the circuit of the ignition switch as at 28, and as it is well known in this art. When the switch 25 is opened, the circuit 20 is broken and no electricity flown therethrough, and of course in such condition the motor car is inactive. When it is desired to activate the car, a switch 25 will be closed as by the usual ignition key.

In the preferred form of my invention I employ a light, generally indicated by the numeral 29 at the rear of the car, said light preferably being in the form of a lamp having an opaque face on which are indicated the letters of the word "Slo" or possibly "Slow," said letters being transparent. When the device is not illuminated, the words "Slo" or "Slow" do not show, but when the lamp is activated the transparent letters will stand out very strongly and indicate to the driver to the rear of the car that this car is slowing down or may stop, and the driver of the rear car can take appropriate measures.

In the embodiment shown in Fig. 1, the signal light "Slo" will be fed from the ignition circuit. For this purpose a conductor 30 is branched off preferably of conductor 27 of the ignition switch 25, and is led into a single pole switch 31, the construction and operation of which will be explained hereinafter. Said switch 31 is of the type which normally is open, breaking the current which it is intended to control. A conductor 32 is connected to the second pole of said switch and leads the current into the signal device 29. The current passing through the same will exit from it as by the conductor 33 and will be grounded as at 34.

It will be seen that normally the signal device, in the case illustrated the lamp 29, will be inactive, the circuit being broken at two places, at the ignition switch 25 and at the control switch 31.

To make my signal operative, the ignition switch 25 must first be closed, that is, the motor put in operative condition, after which my device will operate only when the switch 31 will be closed.

In the preferred embodiment of my invention said switch will be controlled from the usual fuel control or accelerator pedal 35. For this purpose the switch 31 is a well known standard type which normally is open, breaking the circuit, and has a movable pin 36 projecting therefrom normally being in a withdrawn position, as indicated in Fig. 2 through the influence of an appropriate spring in the switch construction, and in such a condition the switch is open. Said switches are well known to those versed in this art and are readily sold on the market.

I provide a pivoted arm 37 pivoted at 38 and having a pivoted link 39 between the upper end of the same and the accelerator pedal 35, the pivoted connection being indicated at 40 and 41. I attach a cord 42 to the pin 36 of the switch 31 and secure the cord to the arm 37 between its end pivots 38 and 40, as indicated at 43.

It is well known that the accelerator pedal normally is in upward position being pressed thereinto by an appropriate spring, diagrammatically indicated at 44, and the direction of its force being indicated by the arrow 45. Normally, therefore, the accelerator pedal 35 will exert a pull on the link 39 and therethrough on the arm 37 in a left hand direction, as indicated by the arrow 46, and thereby a similar pull on the cord 42 by which the pin 36 will be pulled outwardly from the housing of the switch 31, as it is well known in this art, and the switch will be closed thereby the "Slo" light 29 in the rear of the car will be illuminated.

As it is well known, the pedal 35 is in such position when the car either stopped or it is slowing down, and my "Slo" signal automatically operates in such a condition, that is, exactly in the case when it is desired.

When the operator wants to start the car or make it run faster, he will step on the pedal 35 and press it downwardly, as indicated by the arrow 47, the mechanism taking up substantially the position shown in Fig. 2. In that position the pedal 35 is pressed downwardly against the action of the spring 44 and through the link 39 will swing the arm 37 in a right hand direction, as indicated by the arrow 48, which will release the pull on the cord 42 and on the pin 36 permitting said pin to be withdrawn into the switch 31 through the action of the spring therein. As has been mentioned, this is the normal position of such switches sold on the market and in such position the switch is open therefore the circuit will be open and the illumination of the lamp 29 will be extinguished.

In Figs. 4 and 5 I show a preferred embodiment of my signaling device being in the form of a lamp having a housing 49 and being secured on the rear of the car by any appropriate means, as on a bracket 50. The lamp will have illuminating bulbs or similar device in the housing 49 fed by the circuit 33, as has been described hereinbefore, and it may have an opaque, preferably brightly colored plastic front cover 51 on which are arranged said transparent letters 52 to act as described.

Having thus described my invention I claim as new and desire to protect by Letters Patent of the United States:

In a signal device for motor vehicles, said vehicle having an accelerator pedal and means resiliently urging said accelerator into an inoperative position, the combination, of a circuit, a single pole switch in said circuit normally in a closed position, means inserted between said accelerator pedal and said switch whereby upon a depression of the accelerator pedal, said switch will be opened, a movable element in said switch normally urged inwardly into said switch and closing the same, said means inserted between said switch and the accelerator pedal, including a pivoted arm, a pivoted link between the arm and the accelerator pedal, and a cord one end of the same being secured on the arm and the other end on said member in said switch whereby said pedal will move said arm in such a manner as to permit said member to move inwardly into said switch and close the same, but upon a depression of said pedal, said arm will pull said member out of said switch and thereby open it.

THOMAS D. PELLEGRINO.

References Cited in the file of this patent

UNITED STATES PATENTS

| Number | Name | Date |
|---|---|---|
| 1,729,071 | Gilbert | Sept. 24, 1929 |
| 1,952,133 | Kovacs | Mar. 27, 1934 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,260,680 | Nelsen | Oct. 28, 1941 |
| 2,463,088 | Coombs | Mar. 1, 1949 |